May 21, 1940. H. T. KRAFT 2,201,669

EDGE SEALING FOR SPONGE RUBBER

Filed May 27, 1938

INVENTOR
*Herman T. Kraft*
BY *Evans & McCoy*
ATTORNEYS

Patented May 21, 1940

2,201,669

UNITED STATES PATENT OFFICE 2,201,669

EDGE SEALING FOR SPONGE RUBBER

Herman T. Kraft, Akron, Ohio, assignor to The General Tire & Rubber Company, Akron, Ohio, a corporation of Ohio Application May 27, 1938, Serial No. 210,542

5 Claims. (Cl. 18—59)

This invention relates to the edge sealing of sponge rubber articles and the like, and more particularly to providing articles that have an attractively finished edge portion, a method for making such edge portions on the articles, and a suitable apparatus for the practice of the method.

An object of the present invention is to provide rubber articles, such as sponge rubber and the like, that have attractively finished edge portions to replace the raw cut and unfinished edge portions that have heretofore characterized corresponding marketed cut-out rubber articles.

Another object is to provide articles that have neatly finished and attractively shaped edge portions without objectionable increase in their cost of manufacture.

Another object is to provide a method for sealing the edges of rubber articles and the like, that improves their appearance and function and extends their use, that is simply and easily followed, and that is readily adapted for rapid production rate manufacture.

Another object is to provide a suitable illustrative apparatus for the practice of the herein described method, that is of simple and rapid operation, is rugged and of long life, and that is adapted for the rapid production of articles with a minimum of effort, attention and care.

With the above and other objects in view that will be apparent to those who are familiar with the art to which the present invention pertains from the following description, the invention concerns articles that have attractively closed and finished edge portions, a method for forming such edge portions, and a suitable apparatus for finishing the edge portions of such articles.

A suitable illustrative apparatus for edge sealing sponge rubber articles and the like by the herein described method is disclosed in the accompanying drawing, wherein.

Figure 1:
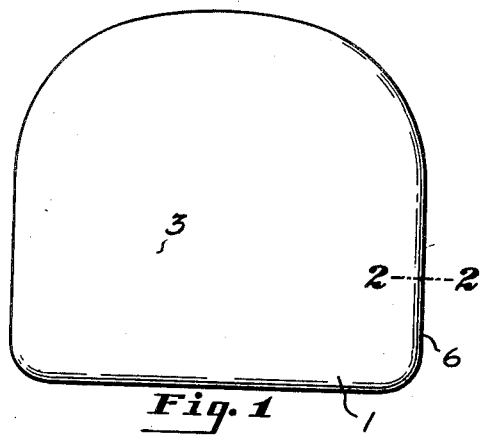
Fig. 1 is a plan view of a chair pad that has a finished edge portion.
Figure 2:
Fig. 2 is a sectional view taken along the line 2—2 of Fig. 1.
Figure 3:
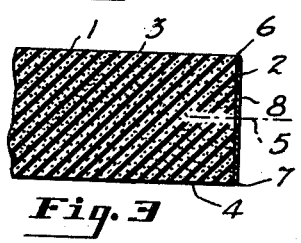
Fig. 3 is a sectional view of a raw cut edge of sponge rubber to which a thin layer of rubber cement has been applied.
Figure 4:
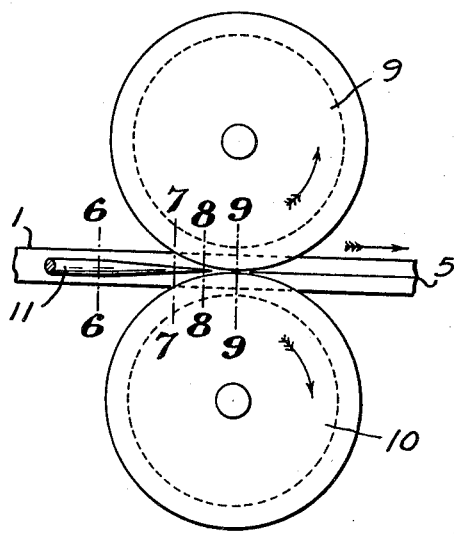
Fig. 4 is an elevation of a sponge rubber edge that is creased along its mid-line and that is then caught in the bight of a pair of compressing rolls.

Sponge rubber articles often have apertures of increasing size inwardly of the surfaces thereof. The rubber mix that is placed in the mold and is then expanded, is apparently pressed closely against the metal surfaces of the mold cavity so that it uniformly wets or distributes itself almost continuously over the mold surfaces. As a result the surfaces of the completed article that is taken out of the mold at the end of the vulcanizing operation, are usually more fine grained and more continuously uniform in structure than is the interior of the article. For this reason the surfaces of a sheet of sponge rubber are often of a finer and more uniform texture, and are more attractive in appearance, than its interior. When such a sheet of rubber is passed through cutting dies, the cut edges of the rubber commonly disclose a structure of increasing coarseness and decreasing attractiveness inwardly of its surfaces. In the past the bulk of cut-out sponge rubber articles have been marketed in this condition.

An article of this type, such as the chair pad 1, that is shown in the accompanying drawing, has an edge 2 that, as cut from sheet rubber, is unsightly as compared with the substantially smooth and fine textured surfaces 3 and 4 that form the top and the bottom surfaces of the sheet.

The present invention contemplates the improvement of the appearance and usefulness of the article by causing the portions of the edge 2 that are disposed on either side of its mid-line 5 to overlie each other and to be permanently secured together so that the edge surfaces between the mid-line 5 and the edge corners 6 and 7 are brought into permanently secured contact with each other substantially throughout their areas. The edge in section of the article so finished completely closed, presents a symmetrically curved appearance to the eye, and adapts the article to increased spheres of usefulness.

When the vulcanization of the article is such as to substantially remove sufficient tackiness from the rubber of which the article is made, a suitable adhesive, such as the rubber cement 8, is applied to the edge 2 in any suitable manner, as by spreading it on with a paddle or brush, rolling it on like ink with a cement bearing roller or the like, or through the use of other suitable types of applicator. The edge 2 is then caused to overlie itself on opposite sides of its mid-line 5 in contacting engagement in any suitable manner. Where the degree of vulcanization, or the like, is such that the rubber is sufficiently tacky to bond together satisfactorily with or without the application of heat as by the use of a hot knife in cutting the rubber, the use of rubber cement may be omitted.

Figure 6:
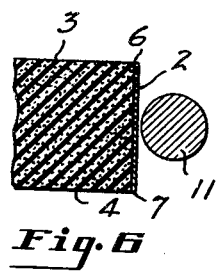
Figs. 6–9, inclusive, are sectional views taken along the correspondingly numbered lines of Fig. 4.
Figure 7:
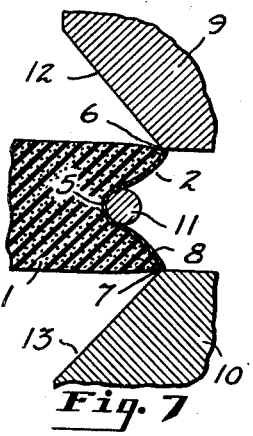
Figure 5:
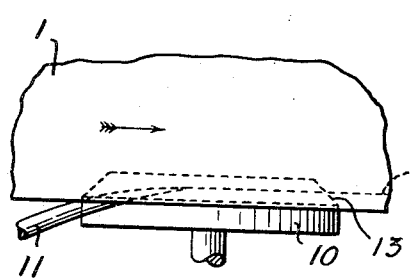
Fig. 5 is a plan view of the rubber sheet in position in one of the pair of rolls that are shown in Fig. 4.
Figure 8:
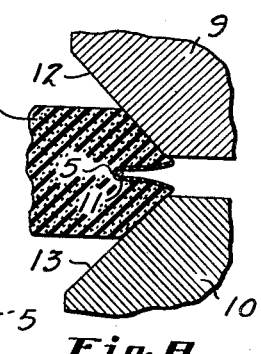
Figure 9:
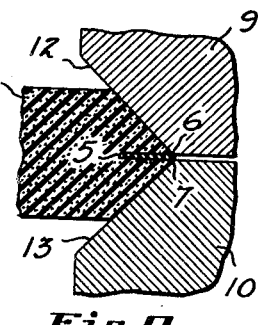

One device for sealing the edge of the article 1 comprises the rolls 9 and 10 that progressively accept the edge of the article between their bight, as is shown in Figs. 6-9, inclusive, in the accompanying drawing.

If preferred, suitable means for assisting in drawing together the portions of the article edge that are disposed on either side of the mid-line may be provided, such as the creaser 11. The creaser is preferably a tapered rod that terminates in one end in a tip that ends substantially axially in line with the nearest approach of the rolls during their rotation. The creaser is positioned to depress the article edge mid-line sufficiently so that the corners of the article edge are brought in substantial registration and contact with each other to form a substantially straight seal line that is substantially midway between the upper and the lower surfaces of the finished article. The creaser is preferably of polished metal or the like, that slides with considerable freedom against the article edge coated with rubber cement.

The rubber cement is of proper degree of tackiness when the edge portions are brought together so that they engage at once and remain in permanent engagement. A minimum quantity of rubber cement is applied to the article edge so that substantially no dried rubber cement appears on the completed edge of the finished article.

The oppositely inclined faces 12 and 13 of the rolls may be straight or curved in section, as desired, and they frictionally engage the upper and the lower surfaces of the article just at the edge corners and increasingly back from the edge corners as the article edge approaches the point where the revolving rolls are closest to each other. The edge corners of the article are thus held substantially in line with each other while the creaser draws the mid-line of the article edge away from the edge corners and permits the edge portions between the mid-line and the edge corners to overlie each other evenly with a minimum of wrinkling and distortion and a maximum of cement bearing attaching surfaces so that the seal therebetween is most nearly perfect.

The edge sealing that forms the subject matter of the present invention extends the sphere of usefulness of articles in a number of ways. For example, a fine grained porous surfaced small disc of sponge rubber is admirably adapted for a powder puff or the like, since the fine pores of its surfaces carry and apply powder nicely and the powder can be readily removed by simply washing the puff in soap and water. A disc of this rubber having an edge portion that is substantially normal to the upper and the lower surfaces of the disc is much less attractive than where the edge is sealed, and is substantially unusable as a puff. Such a puff with a sealed edge is a highly efficient article, of pleasing lines and satiny texture and that is readily adapted for frequent cleansing. It is easily used and is sufficiently compressible so that it may be readily compressed into the modern small compact. Many other similar adaptations will occur to those interested in this field of endeavor.

The herein disclosed method of sealing the edges of articles may be accomplished by pressing the two halves of the exposed edge face together by hand or by other apparatus, such as where one or both of the rolls are stationary or are replaced by flat or curved plates that similarly incline toward each other, or in many other ways.

It is to be understood that the particular embodiments of the invention that are disclosed herein and the particular constructions of the various apparatus that are shown and described herein are presented for purposes of illustration and explanation, and that various changes in the constructions of the parts described and in the adaptations and the uses to which the apparatus may be put, and in the operations of the method that is described herein, may be made without departing from the invention as defined in the appended claims.

What I claim is:

1. The method of finishing sheet material having an adhesive edge, that comprises causing some portions of said edge to overlie and to be secured to other portions thereof by the application of pressure to said edge in a direction that is substantially normal thereto.

2. The method of finishing sheet material that has an edge, comprising applying an adhesive to said edge, and causing a portion of said adhesive bearing edge to overlie and become attached to another portion thereof by applying pressure normal to said edge.

3. The method of finishing an adhesive edge on sheet material, comprising depressing a part of said edge, and feeding the depressed part of the edge of said sheet material into the bight of rolls whereby a portion of said edge is caused to contact and retentively attach itself to another portion thereof.

4. The method of finishing an edge on sheet material, comprising adding an adhesive to said edge, applying a creaser to said edge to depress a portion thereof, and feeding a portion of said material against a roll whereby a portion of said creased edge is caused to overlie and become attached to another portion thereof.

5. The method of forming a rounded edge on soft rubber having surfaces spaced from each other, and an adhesive flat edge substantially normal to one of said surfaces, comprising applying pressure to said edge between said surfaces and in a direction substantially parallel to one of said surfaces, and confining said surfaces sufficiently to cause said edge to retentively overlie itself substantially thruout its area.

HERMAN T. KRAFT.